(12) United States Patent
Ye et al.

(10) Patent No.: US 11,658,828 B2
(45) Date of Patent: May 23, 2023

(54) SECURELY TRANSMITTING COMMANDS TO VEHICLE DURING ASSEMBLY

(71) Applicant: Ford Global Technologies, LLC, Dearborn, MI (US)

(72) Inventors: Xin Ye, Farmington Hills, MI (US); Bradley Warren Smith, Ann Arbor, MI (US); Venkata Kishore Kajuluri, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 17/163,602

(22) Filed: Feb. 1, 2021

(65) Prior Publication Data

US 2022/0247567 A1 Aug. 4, 2022

(51) Int. Cl.
*H04L 9/32* (2006.01)
*H04L 9/14* (2006.01)
*H04L 9/08* (2006.01)

(52) U.S. Cl.
CPC .......... *H04L 9/3247* (2013.01); *H04L 9/0825* (2013.01); *H04L 9/14* (2013.01); *H04L 9/321* (2013.01)

(58) Field of Classification Search
None
See application file for complete search history.

(56) References Cited

U.S. PATENT DOCUMENTS

| | | | | |
|---|---|---|---|---|
| 2006/0168447 A1* | 7/2006 | Pailles | ................. | G07F 7/0866 713/176 |
| 2011/0213968 A1* | 9/2011 | Zhang | ................. | H04L 67/12 713/158 |
| 2016/0156607 A1* | 6/2016 | Kim | ................. | H04W 12/35 726/7 |
| 2018/0183581 A1* | 6/2018 | Elbaz | ................. | G09C 1/00 |
| 2018/0183605 A1 | 6/2018 | Kawabata et al. | | |
| 2018/0374087 A1* | 12/2018 | Lu | ................. | H04L 63/123 |

(Continued)

FOREIGN PATENT DOCUMENTS

| | | |
|---|---|---|
| DE | 102009025585 A1 | 12/2010 |
| JP | 6203146 B2 | 9/2017 |

OTHER PUBLICATIONS

Guo, L., et al., 2017. A secure mechanism for big data collection in large scale internet of vehicle. IEEE Internet of Things Journal, 4(2), pp. 601-610. (Year: 2017).*

(Continued)

*Primary Examiner* — Luu T Pham
*Assistant Examiner* — Edward X Long
(74) *Attorney, Agent, or Firm* — Brandon Hicks; Bejin Bieneman PLC (57) ABSTRACT

A system includes a control module and a local server. The server is programmed to transmit a command to perform an operation to a plurality of vehicles including a vehicle including the control module. The command including a digital signature that is common across the vehicles. The control module is programmed to receive a temporary value; receive the command; decrypt the digital signature in the command with the temporary value; upon verifying the decrypted digital signature, perform the operation; and upon a metric incrementing to a threshold value, prevent decryption of the digital signature with the temporary value.

16 Claims, 4 Drawing Sheets

(56) References Cited

U.S. PATENT DOCUMENTS

2019/0268336 A1* 8/2019 Gomi .................... H04L 9/0894
2020/0213287 A1   7/2020 Zhang et al.
2020/0259650 A1* 8/2020 Montemurro .......... H04L 9/321
2021/0392496 A1* 12/2021 Vladimerou .......... H04W 12/61

OTHER PUBLICATIONS

Arif, M. et al., 2018. Secure VANETs: trusted communication scheme between vehicles and infrastructure based on fog computing. Stud. Inform. Control, 27(2), pp. 235-246. (Year: 2018).*

* cited by examiner

SECURELY TRANSMITTING COMMANDS TO VEHICLE DURING ASSEMBLY

BACKGROUND

Symmetric-key algorithms are cryptographic algorithms using a same cryptographic key for encrypting unencrypted data and for decrypting encrypted data. Symmetric-key algorithms can use stream ciphers or block ciphers. Stream ciphers encrypt characters of a message one by one. Block ciphers encrypt a block of bits while padding the plaintext. An example of block ciphering is the Advanced Encryption Standard algorithm promulgated by the National Institute of Standards and Technology. Vehicles can use symmetric keys for communicating between control modules on board the vehicle. The initial set of symmetric keys can be distributed to the control modules during assembly of the vehicle at end-of-line.

DETAILED DESCRIPTION

A system includes a control module and a server. The server is programmed to transmit a command to perform an operation to a plurality of vehicles including a vehicle including the control module. The command includes a digital signature that is common across the vehicles. The control module is programmed to receive a temporary value; receive the command; decrypt the digital signature in the command with the temporary value; upon verifying the decrypted digital signature, perform the operation; and upon a metric incrementing to a threshold value, prevent decryption of the digital signature with the temporary value.

The server may be a local server, and the system may further include a trusted server programmed to generate the digital signature based on the temporary value and transmit the digital signature to the local server.

The temporary value may not stored on the server.

The control module may be further programmed to receive a public-private key pair that is unique to the control module. A private key of the public-private key pair may be not stored on the server.

A public key of the public-private key pair may be not stored on the server.

A computer includes a processor and a memory storing instructions executable by the processor to receive a public-private key pair that is unique to the computer; receive a temporary value that is common across a plurality of computers including the computer; receive a command to perform an operation, the command including a digital signature; decrypt the digital signature with the temporary value; upon verifying the decrypted digital signature, perform the operation; and upon a metric incrementing to a threshold value, prevent decryption of the digital signature with the temporary value.

The metric may be a mileage of a vehicle including the computer.

The metric may be a number of starts of a vehicle including the computer.

The metric may be a number of times receiving the command.

The command may be to distribute a plurality of symmetric keys to a plurality of control modules in a vehicle including the computer.

The instructions may include instructions to, upon the decrypted digital signature failing verification, prevent the operation from being performed.

A method includes receiving a temporary value by a control module; transmitting a command to a plurality of vehicles including a first vehicle including the control module by a server, the command being to perform an operation, the command including a digital signature that is common across the vehicles; decrypting the digital signature in the command with the temporary value by the control module; upon verifying the decrypted digital signature, performing the operation by the control module; and upon a metric incrementing to a threshold value, preventing decryption of the digital signature with the temporary value by the control module.

The server may be in a same location with the vehicles when transmitting to the vehicles. The server may be a local server, and the method may further include generating the digital signature based on the temporary value by a trusted server, the trusted server being remote from the location; and transmitting the digital signature by the trusted server to the local server.

The threshold value may be sufficiently great for the first vehicle to exit the location before the metric increments to the threshold value. The location may be an assembly plant for the vehicles.

During assembly of a vehicle 100, various security-related operations may need to be performed with respect to control modules 102, 104 on board the vehicle 100 after those control modules 102, 104 have been installed, for example, distributing symmetric keys to the control modules 102, 104, configuring the control modules 102, 104, etc. These operations may be performed at end-of-line, i.e., after the components of the vehicle 100 have been assembled and before the vehicles 100 are shipped to dealers or consumers. The vehicles 100 are thus ready to operate upon delivery. These operations are more secure if they can be authorized only by a trusted party, e.g., only by the manufacturer, which prevents unauthorized access to the control modules 102, 104 that may occur if a third party performs the operations after the vehicle 100 leaves a specified location, such as an assembly plant.

With reference to the Figures, a system 101 includes a control module 102, 104, and a local server 106. The local server 106 is programmed to transmit a command to perform an operation to a plurality of vehicles 100 including a vehicle 100 including the control module 102, 104. The command includes a digital signature that is common across the vehicles 100. The control module 102, 104 is programmed to receive a temporary value; receive the command; decrypt the digital signature in the command with the temporary value; upon verifying the decrypted digital signature, perform the operation; and upon a metric incrementing to a threshold value, prevent decryption of the digital signature with the temporary value.

By giving a control module 102, 104 the temporary value to decrypt the digital signature in the command, the system 101 permits the same digital signature to be used for several vehicles 100. The digital signature can be stored at the local server 106 that is within a same location (e.g., an assembly plant) as the vehicle 100, and that local server 106 can be used to authorize the control modules 102, 104 to perform the operation. Beneficially, the local server 106 does not need to store data specific to the control module 102, 104, such as a public or private key of the control module 102, 104. The data specific to the control module 102, 104 can be stored at a trusted server 108 located away from the location of vehicle(s) 100. Because the trusted server 108 does not need to be accessed during assembly of the vehicles 100, a lack of connectivity to the trusted server 108 does not prevent security-related operations, e.g., during assembly of the vehicles 100, and the information on the trusted server 108 can be kept at a more secure location.

Tracking the metric of the vehicle 100 provides a way to enable use of the temporary value at a location such as an assembly plant but disable use of the temporary value soon after the vehicle 100 leaves the location. Example metrics include mileage of the vehicle 100, number of starts of the vehicle 100, and number of times receiving the command by the vehicle 100.

Figure 1:
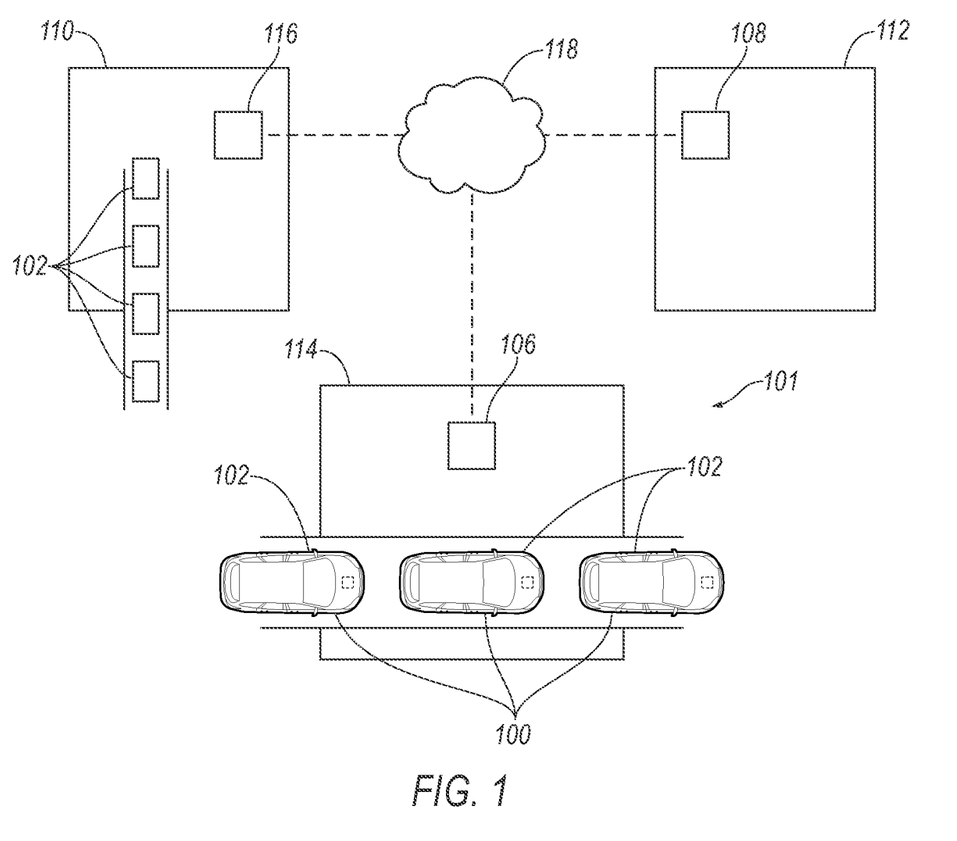
FIG. 1 is a diagram of an example of facilities involved in assembling vehicles having control modules.

With reference to FIG. 1, a manufacturing process for the vehicles 100 can include a first location 110 at which the control modules 102, 104 are manufactured, a second location 112 at which the trusted server 108 is located, and a third location 114 at which the vehicles 100 are assembled. The first location 110 is where the control modules 102, 104 are manufactured, e.g., assembled. The control modules 102, 104 can be brought on line for the first time at the first location 110.

The first location 110 can include a first-location server 116. The first-location server 116 is a microprocessor-based computing device, e.g., a generic computing device including a processor and a memory, an electronic controller or the like, a field-programmable gate array (FPGA), an application-specific integrated circuit (ASIC), etc. The first-location server 116 can thus include a processor, a memory, etc. The memory of the first-location server 116 can include media for storing instructions executable by the processor as well as for electronically storing data and/or databases, and/or the first-location server 116 can include structures such as the foregoing by which programming is provided. The first-location server 116 can be multiple computers coupled together. The first-location server 116 can communicate with the control modules 102, 104 while the control modules 102, 104 are in the first location 110, and the first-location server 116 can communicate through a network 118 such as a wide area network and/or the internet.

The second location 112 can be a secure location for the trusted server 108. The second location 112 is physically separate from the first location 110 and from the third location 114, making the trusted server 108 remote from the first location 110 and from the third location 114.

The trusted server 108 is a microprocessor-based computing device, e.g., a generic computing device including a processor and a memory, an electronic controller or the like, a field-programmable gate array (FPGA), an application-specific integrated circuit (ASIC), etc. The trusted server 108 can thus include a processor, a memory, etc. The memory of the trusted server 108 can include media for storing instructions executable by the processor as well as for electronically storing data and/or databases, and/or the trusted server 108 can include structures such as the foregoing by which programming is provided. The trusted server 108 can be multiple computers coupled together. The trusted server 108 can communicate through the network 118.

The third location 114 can be a specified location such as an assembly plant for the vehicles 100. The third location 114 can receive components for the vehicles 100 from suppliers and manufacturers, e.g., the control modules 102, 104 from the first location 110. The control modules 102, 104 can be shipped from the first location 110 to the third location 114. At the third location 114, the components are assembled into the vehicles 100. During the assembly process, the control modules 102, 104 are installed in the vehicles 100. As described below, once the control modules 102, 104 are installed, the local server 106 can transmit to the control modules 102, 104 in the vehicles 100 while the vehicles 100 are in the third location 114 with the local server 106.

The local server 106 is a microprocessor-based computing device, e.g., a generic computing device including a processor and a memory, an electronic controller or the like, a field-programmable gate array (FPGA), an application-specific integrated circuit (ASIC), etc. The local server 106 can thus include a processor, a memory, etc. The memory of the local server 106 can include media for storing instructions executable by the processor as well as for electronically storing data and/or databases, and/or the local server 106 can include structures such as the foregoing by which programming is provided. The local server 106 can be multiple computers coupled together.

Figure 2:
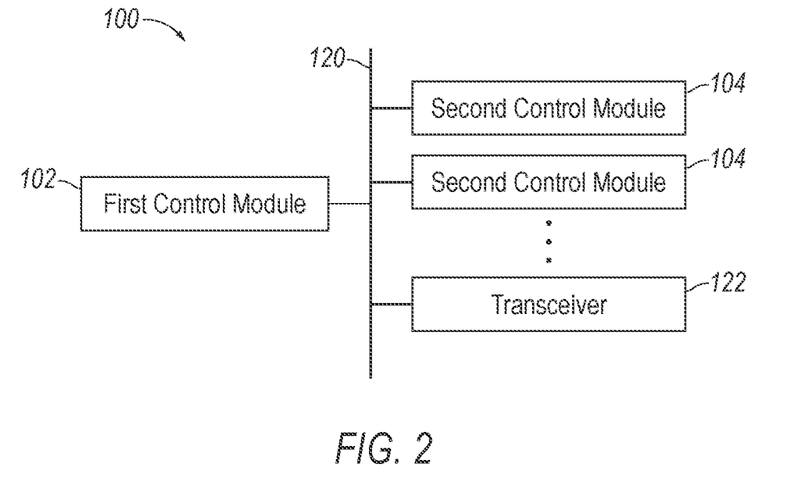
FIG. 2 is a block diagram of an example of one of the vehicles.

With reference to FIG. 2, one of the vehicles 100 assembled at the third location 114 may be any suitable type of automobile, e.g., a passenger or commercial automobile such as a sedan, a coupe, a truck, a sport utility, a crossover, a van, a minivan, a taxi, a bus, etc. The vehicle 100, for example, may be autonomous. In other words, the vehicle 100 may be autonomously operated such that the vehicle 100 may be driven without constant attention from a driver, i.e., the vehicle 100 may be self-driving without human input.

The vehicle 100 includes a plurality of the control modules 102, 104. The control modules 102, 104 include a first control module 102 and at least one second control module 104. As described below, the first control module 102 may be responsible for distributing symmetric keys to the second control modules 104.

The control modules 102, 104 are microprocessor-based computing devices, e.g., generic computing devices each including a processor and a memory, electronic controllers or the like, field-programmable gate arrays (FPGA), application-specific integrated circuits (ASIC), etc. The control modules 102, 104 can thus include a processor, a memory, etc. The memory of the control modules 102, 104 can include media for storing instructions executable by the processor as well as for electronically storing data and/or databases, and/or the control modules 102, 104 can include structures such as the foregoing by which programming is provided. The first control module 102 can be, e.g., a gateway module. The second control modules 104 can include, e.g., a restraint control module, a powertrain control module, etc.

The first control module 102 may transmit and receive data through a communications network 120 such as a controller area network (CAN) bus, Ethernet, WiFi, Local Interconnect Network (LIN), onboard diagnostics connector (OBD-II), and/or by any other wired or wireless communications network. The first control module 102 may be communicatively coupled to the second control modules 104, a transceiver 122, and other components via the communications network 120.

The transceiver 122 may be adapted to transmit signals wireles sly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 122 may be adapted to communicate with a remote server, that is, a server distinct and spaced from the vehicle 100. The remote server may be located outside the vehicle 100. For example, once the vehicle 100 is assembled, the remote server may be associated with another vehicle 100 (e.g., V2V communications), an infrastructure component (e.g., V2I communications), an emergency responder, a mobile device associated with the owner of the vehicle 100, etc. While the vehicle 100 is at the third location 114, the remote server can be the local server 106. The transceiver 122 may be one device or may include a separate transmitter and receiver.

Figure 3:
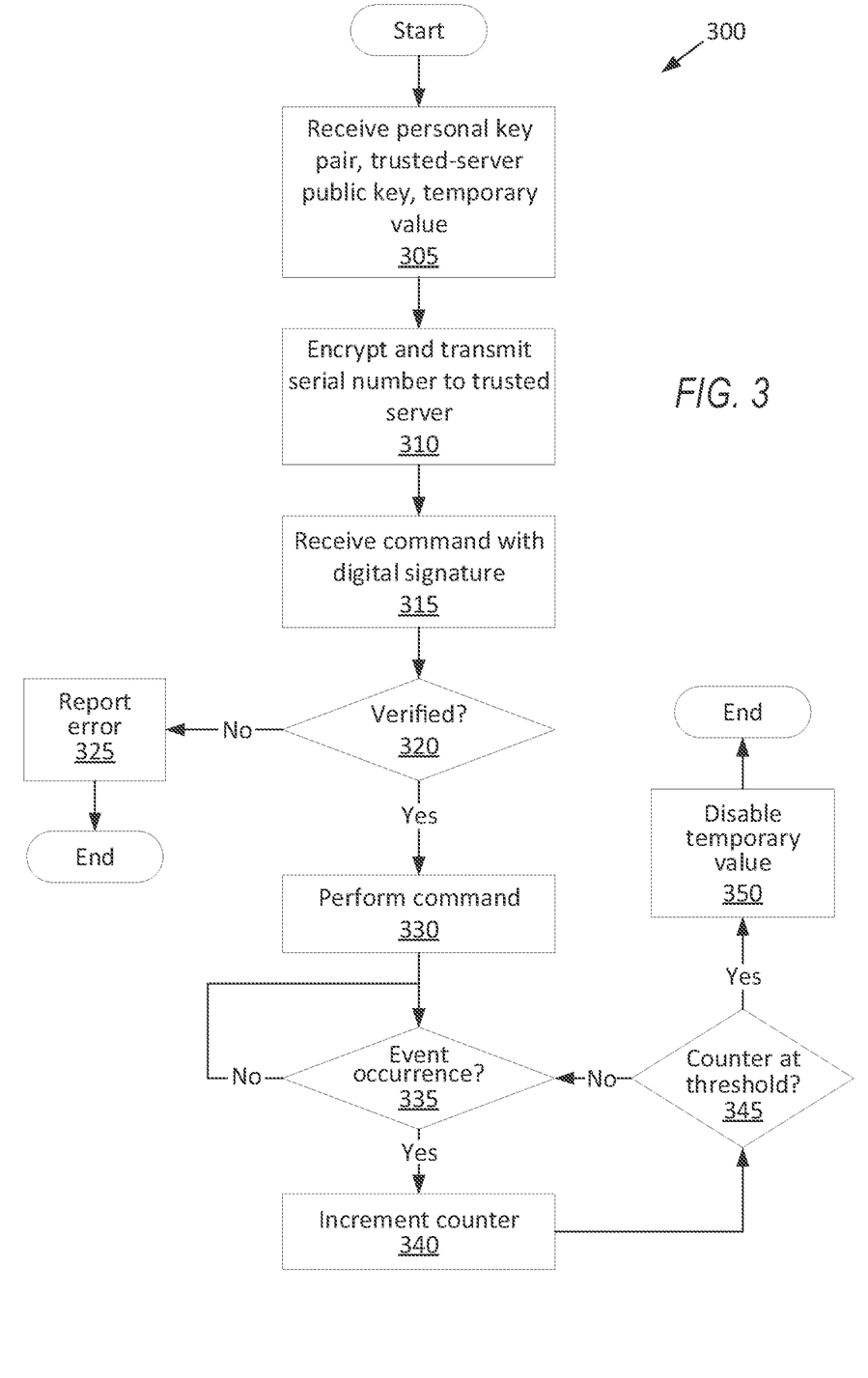
FIG. 3 is a process flow diagram of an example process for a control module of the one of the vehicles to perform an operation upon securely receiving a command.

FIG. 3 is a process flow diagram illustrating an exemplary process 300 for the first control module 102 to perform an operation based on a command from the local server 106. The memory of the first control module 102 stores executable instructions for performing the steps of the process 300 and/or programming can be implemented in structures such as mentioned above. As a general overview of the process 300, while at the first location 110, the first control module 102 receives a public-private key pair that is unique to the first control module 102 and a temporary value that is common across many first control modules 102 being manufactured contemporaneously, and the first control module 102 encrypts and transmits its serial number and a public key of its public-private key pair to the trusted server 108. After the first control module 102 has been shipped to the third location 114 and installed in the vehicle 100, the first control module 102 receives a command including a digital signature from the local server 106. For the purposes of this disclosure, a "digital signature" is data encrypted with a private key and decryptable with a corresponding public key to authenticate a message in which the data appears; in this case, the private key is a temporary private key, and the public key is the temporary value. As described below with respect to a process 400, the trusted server 108 will have generated the digital signature from the temporary value and transmitted the digital signature to the local server 106. If verification of the digital signature by the first control module 102 fails, the first control module 102 prevents the operation from being performed. Upon verifying the digital signature, the first control module 102 performs the operation. As the vehicle 100 is at the third location 114 and then leaves the first location 110, the first control module 102 increments a counter upon occurrences of an event. Once the counter reaches a threshold value, the first control module 102 disables the temporary value, thereby preventing future decryption of the digital signature with the temporary value.

The process 300 begins in a block 305, in which the first control module 102 receives the public-private key pair, a trusted-server public key of the trusted server 108, and the temporary value. The first control module 102 performs the block 305 while the first control module 102 is still at the first location 110. The public-private key pair includes a public key of the first control module 102 and a private key of the first control module 102 corresponding to the public key of the first control module 102. The public-private key pair is unique to each first control module 102; in other words, both the public key and the corresponding private key are unique to each first control module 102. The trusted-server public key is a public key that can be used to send encrypted messages to the trusted server 108, which can decrypt the messages with a corresponding trusted-server private key stored only on the trusted server 108. The temporary value is a value that can be used to decrypt the digital signature included with the command, as described below with respect to a block 315. For example, the temporary value can be a temporary public key for which a corresponding temporary private key has been supplied to the trusted server 108. The first-location server 116 can generate the temporary value and the corresponding temporary private key and deliver the temporary private key to the trusted server 108 (e.g., by physically sending a storage drive storing the temporary private key), or the trusted server 108 can generate the temporary value and the temporary private key and transmit the temporary value to the first-location server 116. The temporary value is common across a plurality of the first control modules 102, i.e., each of the plurality of the first control modules 102 receives the same temporary value. The plurality of the first control modules 102 that receives the temporary value can be, e.g., an entire manufacturing batch or all the first control modules 102 manufactured within a timeframe, e.g., six months or a year.

Next, in a block 310, the first control module 102 encrypts and sends its serial number and the public key of its public-private key pair to the trusted server 108. The first control module 102 uses the trusted-server public key for the encryption. The first control module 102 can transmit the encrypted data to the trusted server 108 via the first-location server 116 and the network 118.

Next, in a block 315, after the first control module 102 has been shipped to the third location 114 and installed in the vehicle 100, the first control module 102 receives the command from the local server 106. The command includes the digital signature and an unencrypted instruction to perform the operation. As described below with respect to the process 400, the trusted server 108 generates the digital signature, e.g., from the temporary private key corresponding to the temporary value, and transmits the digital signature to the local server 106. The digital signature can be the command or a message to be included with the command encrypted with the temporary private key. As described below with respect to a process 500, the local server 106 receives the digital signature and transmits the command with the same digital signature to a plurality of vehicles 100. Upon receiving the command, the first control module 102 decrypts the digital signature in the command by using the temporary value.

Next, in a decision block 320, the first control module 102 determines whether the decrypted digital signature is verified. For example, the first control module 102 determines whether the decrypted digital signature matches an unencrypted portion of the command or matches an unencrypted message included with the command. Upon the decrypted digital signature failing verification, the process 300 proceeds to a block 325. Upon verification of the digital signature, the process 300 proceeds to a block 330.

In the block 325, the first control module 102 prevents the operation in the command from being performed. The first control module 102 reports an error, e.g., by setting a fault code such as a diagnostic trouble code (DTC) or the like. A technician at the third location 114 can assess the issue using the fault code. After the block 325, the process 300 ends.

In the block 330, which may follow the decision block 320, the first control module 102 performs the operation in the command. The operation can be a security-related type of operation. For example, the operation can be distributing a plurality of symmetric keys to the second control modules 104 in the vehicle 100. For another example, the operation can be setting certain configurations of the second control modules 104.

Next, in a decision block 335, the first control module 102 determines whether an event measured by the metric has occurred. The metric is chosen to be a measurable quantity that increases with continued use of the vehicle 100 and that does not decrease over time. For example, the metric can be a mileage of the vehicle 100, a number of starts of the vehicle 100, a number of times receiving the command in the block 315, etc. The number of starts of the vehicle 100 is a number of times the vehicle 100 switches from an off state to an on state, e.g., a number of key ignitions. If the event being tracked by the metric has not occurred, the process 300 stays at the decision block 335 to wait for the event to occur. If the event being tracked by the metric has occurred, the process 300 proceeds to a block 340.

In the block 340, the first control module 102 increments the metric according to the event. For example, if the vehicle 100 has driven five miles, the mileage increases by five. For another example, if the vehicle 100 has just been started, the number of starts increases by one. For another example, if the command has been received in the block 315, the number of times receiving the command increases by one. Any of these metrics may be tracked by, e.g., one of the second control modules 104 and reported to the first control module 102 over the communications network 120.

Next, in a decision block 345, the first control module 102 determines whether the metric has incremented to the threshold value. The threshold value is chosen to be sufficiently great for the vehicle 100 to exit the third location 114 before the metric increments to the threshold value, and the threshold value is chosen to be reached soon after the vehicle 100 exits the third location 114. For example, the threshold value for the mileage can be fifty miles, the threshold value for the number of starts can be one hundred, or the threshold value for the number of times receiving the command can be two. If the metric has not yet incremented to the threshold value, the process 300 returns to the decision block 335 to continue monitoring for the events. Upon the metric incrementing to the threshold value, the process 300 proceeds to a block 350.

In the block 350, the first control module 102 disables the temporary value. The first control module 102 thereby prevents decryption of the digital signature using the temporary value in case the first control module 102 receives the command again, or receives a communication purporting to be the command. After the block 350, the process 300 ends.

Figure 4:
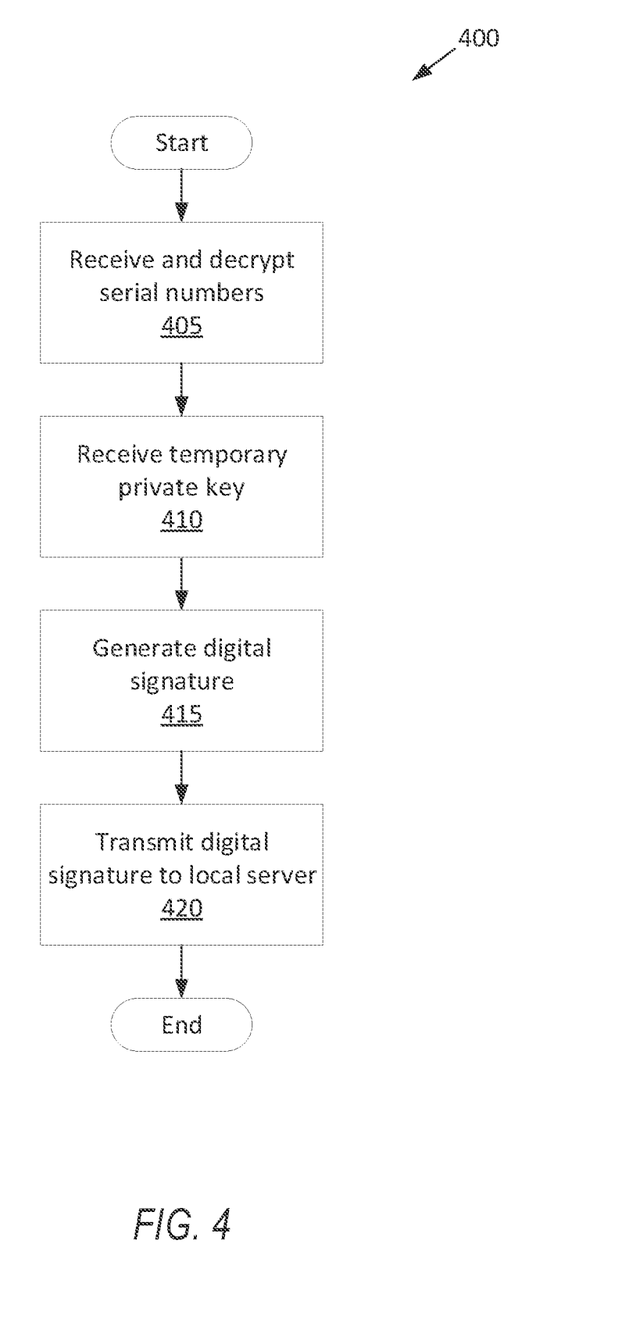
FIG. 4 is a process flow diagram of an example process for a trusted server to generate a digital signature for a local server.

FIG. 4 is a process flow diagram illustrating an exemplary process 400 for the trusted server 108 to generate the digital signature for the local server 106. The memory of the trusted server 108 stores executable instructions for performing the steps of the process 400 and/or programming can be implemented in structures such as mentioned above. As a general overview of the process 400, the trusted server 108 receives and decrypts the serial numbers and public keys of the first control modules 102, receives the temporary private key, generates the digital signature using the temporary private key, and transmits the digital signature to the local server 106.

The process 400 begins in a block 405, in which the trusted server 108 receives the serial numbers and public keys transmitted by the plurality of the first control modules 102, as described above with respect to the block 310. The trusted server 108 decrypts the serial numbers and public keys using the trusted-server private key. The trusted server 108 stores the serial numbers and public keys for future encrypted communications with the first control modules 102 after the vehicles 100 have exited the third location 114.

Next, in a block 410, the trusted server 108 receives the temporary private key corresponding to the temporary value from the first-location server 116 (or other data from which the trusted server 108 can generate a digital signature decryptable using the temporary value). The temporary private key is encrypted with the trusted-server public key when received by the trusted server 108, and the trusted server 108 decrypts the temporary private key using the trusted-server private key.

Next, in a block 415, the trusted server 108 generates the digital signature. The digital signature is a portion of the command or a message included with the command that is then encrypted. The digital signature is based on the temporary value, e.g., is encrypted using the temporary private key corresponding to the temporary value.

Next, in a block 420, the trusted server 108 transmits the digital signature to the local server 106, e.g., via the network 118 or by physically sending a storage drive storing the digital signature to be plugged into the local server 106. After the block 420, the process 400 ends.

Figure 5:
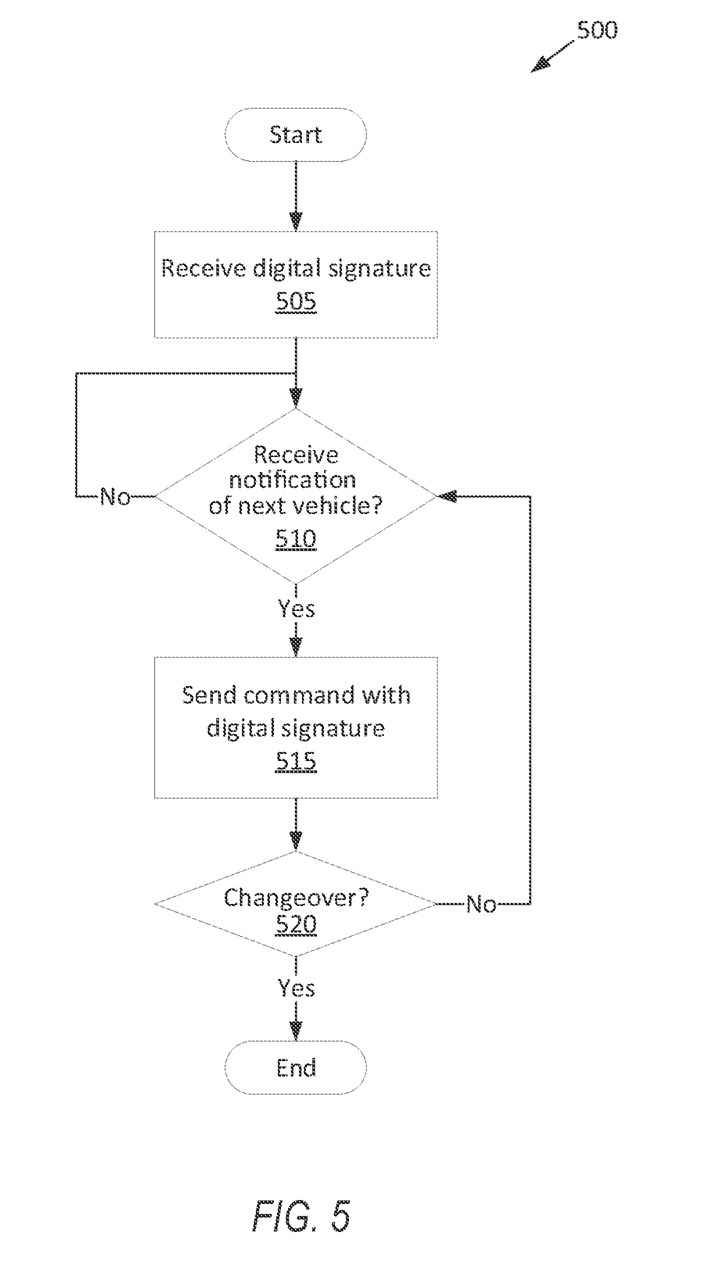
FIG. 5 is a process flow diagram of an example process for the local server to transmit the command to the vehicles using the digital signature.

FIG. 5 is a process flow diagram illustrating an exemplary process 500 for the local server 106 to transmit the command including an operation to the vehicles 100 using the digital signature. The memory of the local server 106 stores executable instructions for performing the steps of the process 500 and/or programming can be implemented in structures such as mentioned above. As a general overview of the process 500, before the assembly of the vehicles 100 begins, the local server 106 receives the digital signature. Once assembly begins, the local server 106 transmits the command with the digital signature to each of the plurality of vehicles 100 in turn as the local server 106 receives notification that the next of the vehicles 100 is ready. The process 500 continues until a changeover to a new digital signature occurs.

The process 500 begins in a block 505, in which the local server 106 receives the digital signature from the trusted server 108, sent as described above with respect to the block 420. The digital signature is stored on the local server 106. The temporary value is not stored on the local server 106, so the local server 106 cannot decrypt the digital signature. The temporary private key is not stored on the local server 106, so the local server 106 cannot generate the digital signature.

Next, in a decision block 510, the local server 106 determines whether it has received a notification of a next of the plurality of vehicles 100. For example, the local server 106 can receive an input from a technician indicating that the next vehicle 100 is ready for the command. For another example, the local server 106 can receive data from, e.g., a position sensor indicating that the next vehicle 100 is in a position along the assembly line designated for the vehicle 100 to receive the command. If the local server 106 has not yet received the notification, the process 500 stays at the decision block 510 to wait for the notification. Once the local server 106 receives the notification, the process 500 proceeds to a block 515.

In the block 515, the local server 106 transmits the command including an operation to be performed to the next vehicle 100 to perform the operation. The vehicle 100 is still in the third location 114 with the local server 106 when the local server 106 transmits the command to the vehicle 100. The first control module 102 of the vehicle 100 receives the command as described above with respect to the block 315.

The command includes the digital signature. The command, and specifically the digital signature, is common across the vehicles 100 until a changeover occurs.

The local server 106 does not store either the private key or the public key of the public-private key pair of the first control module 102. The local server 106 is thus not able to send different commands than the one for which the digital signature was generated.

Next, in a decision block 520, the local server 106 determines whether a changeover has been indicated. A changeover occurs when the third location 114 begins assembling vehicles 100 using first control modules 102 having a new temporary value, necessitating a new digital signature. For example, the changeover can occur at a designated timeframe, e.g., six months or one year after the current digital signature began being used, or with a designated event, e.g., the end of a specific batch of the first control modules 102. If a changeover is not indicated, the process 500 returns to the decision block 510 to await notification of the next vehicle 100 having the same temporary value. If a changeover occurs, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a control module; and
a server at a predefined location;
the server being programmed to transmit a command to perform an operation to a plurality of vehicles including a vehicle including the control module, the command including a digital signature that is common across the vehicles; and
the control module being programmed to:
receive a temporary value;
receive the command;
decrypt the digital signature in the command with the temporary value;
upon verifying the decrypted digital signature, perform the operation; and
upon a metric incrementing to a threshold value, prevent decryption of the digital signature with the temporary value;
the metric incrementing starting from the vehicle including the control module being at the location;
wherein the location is an assembly plant for the vehicles.

2. The system of claim 1, wherein the server is a local server, the system further comprising a trusted server programmed to:
generate the digital signature based on the temporary value; and
transmit the digital signature to the local server.

3. The system of claim 1, wherein the temporary value is not stored on the server.

4. The system of claim 1, wherein the control module is further programmed to receive a public-private key pair that is unique to the control module.

5. The system of claim 4, wherein a private key of the public-private key pair is not stored on the server.

6. The system of claim 4, wherein a public key of the public-private key pair is not stored on the server.

7. A computer comprising a processor and a memory storing instructions executable by the processor to:
receive a public-private key pair that is unique to the computer;
receive a temporary value that is common across a plurality of computers including the computer;
receive a command to perform an operation from a server at a location, the command including a digital signature;
decrypt the digital signature with the temporary value;
upon verifying the decrypted digital signature, perform the operation; and
upon a metric incrementing to a threshold value, prevent decryption of the digital signature with the temporary value;
the metric incrementing starting from a vehicle including the computer being at the location;
wherein the location is an assembly plant for the vehicles.

8. The computer of claim 7, wherein the metric is a distance physically driven by the vehicle including the computer.

9. The computer of claim 7, wherein the metric is a number of starts of the vehicle including the computer.

10. The computer of claim 7, wherein the metric is a number of times receiving the command.

11. The computer of claim 7, wherein the command is to distribute a plurality of symmetric keys to a plurality of control modules in the vehicle including the computer.

12. The computer of claim 7, wherein the instructions include instructions to, upon the decrypted digital signature failing verification, prevent the operation from being performed.

13. A method comprising:
receiving a temporary value by a control module;
transmitting a command to a plurality of vehicles including a first vehicle including the control module by a server, the command being to perform an operation, the command including a digital signature that is common across the vehicles, the server being at a predefined location;
decrypting the digital signature in the command with the temporary value by the control module;
upon verifying the decrypted digital signature, performing the operation by the control module; and
upon a metric incrementing to a threshold value, preventing decryption of the digital signature with the temporary value by the control module;
the metric incrementing starting from the vehicle including the control module being at the location;
wherein the location is an assembly plant for the vehicles.

14. The method of claim 13, wherein the server is in a same location with the vehicles when transmitting to the vehicles.

15. The method of claim 14, wherein the server is a local server, the method further comprising:
generating the digital signature based on the temporary value by a trusted server, the trusted server being remote from the location; and
transmitting the digital signature by the trusted server to the local server.

16. The method of claim 14, wherein the threshold value is sufficiently great for the first vehicle to exit the location before the metric increments to the threshold value.

* * * * *